J. W. HYATT.
Manufacture of Sheets of Celluloid and other Analogous Plastic Compositions.
No. 205,271. Patented June 25, 1878.
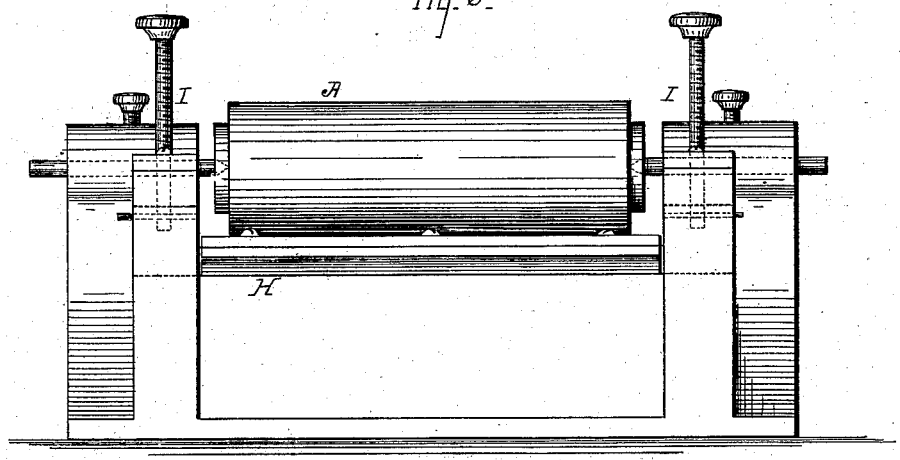
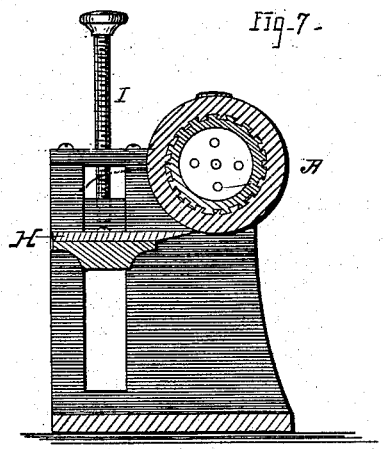 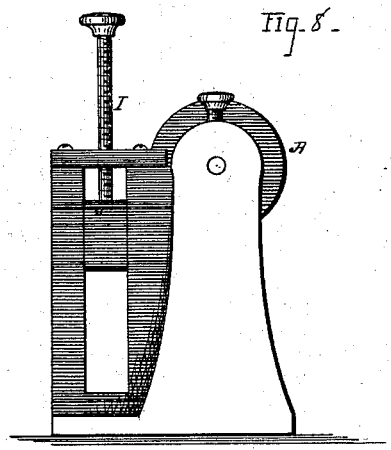

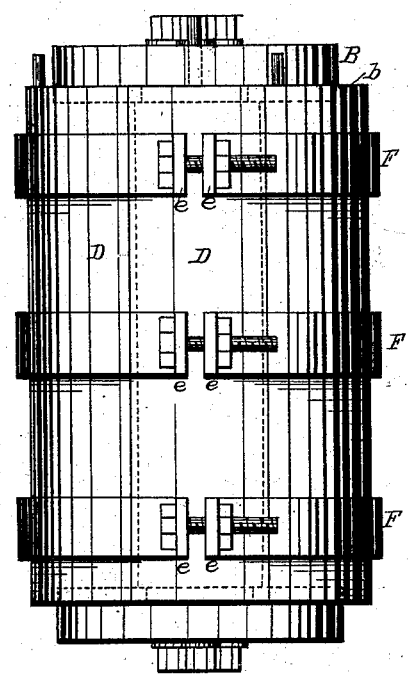
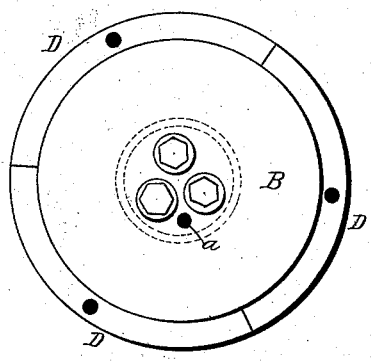
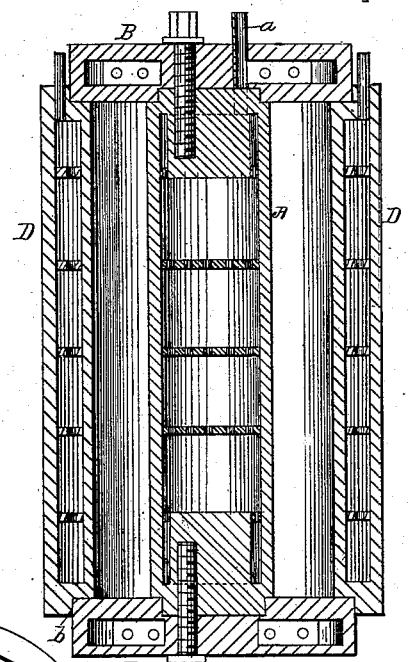
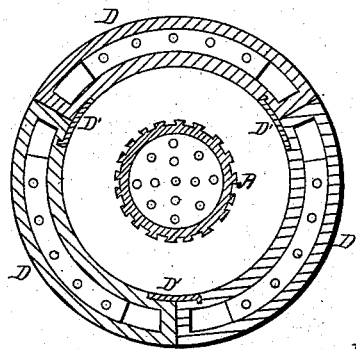
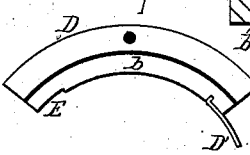

UNITED STATES PATENT OFFICE

JOHN W. HYATT, OF NEWARK, NEW JERSEY, ASSIGNOR TO THE CELLULOID MANUFACTURING COMPANY, OF NEW YORK, N. Y.

IMPROVEMENT IN THE MANUFACTURE OF SHEETS OF CELLULOID AND OTHER ANALOGOUS PLASTIC COMPOSITIONS.

Specification forming part of Letters Patent No. 205,271, dated June 25, 1878; application filed May 15, 1878.

*To all whom it may concern:*

Be it known that I, JOHN W. HYATT, of Newark, in the county of Essex and State of New Jersey, have invented a new and useful Improvement in the Manufacture of Sheets of Celluloid and other Analogous Plastic Compositions, of which the following is a specification, reference being had to the accompanying drawings.

The invention relates to certain means for affixing a cylindrical body of plastic composition rigidly upon a core, to the end that the cylinder thus formed may be subsequently submitted to the action of a knife, which shall reduce it into thin strips or sheets.

The above operation is effected by placing a number of sheets of plastic composition upon a core, hollow as to its interior, and indented, corrugated, or provided with projections upon its exterior, which core is secured between hollow heads or end plates, the material being solidified on the core by means of two or more hollow, curved, heated segmental plates, which are contracted upon the material when in position by means of bands and nuts or screws, and which, when united, form a hollow cylinder, inclosing the material on the core, which, with the end plates and curved segmental plates, is provided with proper means for receiving and discharging a heating or cooling agent, the plates being coincidently provided with an aperture to receive a spring, which, as the plates are contracted against the composition, is forced outward, sealing the joints between the plates in an air-tight manner.

Referring to the accompanying drawings, Figure 1 is a plan view of the exterior of the cylindrical chamber formed by the junction of the segmental plates and the heads. Fig. 2 is an end view of same, showing the inlets for the heating agent. Fig. 3 is a vertical central transverse section of same. Fig. 4 is a longitudinal central section of same. Fig. 5 is an end view of one of the segmental plates. Fig. 6 is a side elevation of the device for reducing the roll of composition to sheets, the roll being shown formed on the cylinder. Fig. 7 is a vertical central tranverse section of same. Fig. 8 is an end view of same.

In the accompanying drawings, A represents a hollow cylinder, braced internally, so as to prevent its collapsing under pressure, and provided with a suitable inlet, *a*, for receiving steam or other heating, or water or other cooling, agent. The exterior surface of the cylinder A is roughened, or indented, or corrugated in any suitable manner, so as to permit the composition, as its dries or chills, and thus shrinks, to exert a tension on the surface of the core, in which respect this element of the invention is analogous to that shown and described in the Letters Patent of the United States No. 199,908, granted to John W. Hyatt, for process of manufacturing sheets of plastic composition, dated February 5, 1878.

The braces are provided with apertures, in order to permit the heating or cooling agents to flow freely into the cylinder, which is provided at either end with journals, that are set into corresponding recesses at the center of the heads B, which are hollow, braced, and provided with suitable means for receiving the said heating agents, being preferably so arranged that the supply of the agent may flow through the plate B into the core.

The segmental plates D, two or more of which are used, are hollow, braced internally, and constructed so as to receive heating or cooling agents, and of such size as to accurately fill the space between the heads B, being beveled on their edges in such a manner as that when united they may form a close cylindrical chamber about the core A.

The plates D are provided at their edges with the cavity E, which is partially in each of the adjoining plates, and on one side there is attached in the cavity the edge or end of a spring, D', having a tension toward the central core. Thus, when any pressure is exerted outward, the spring is forced correspondingly, and thus closes the joint or seam between the plates D, the spring being of such thickness and the recess of such depth that when the spring is forced outward against the plates its inner surface shall be coincident with the adjacent surface of the interior of the plates.

The ends of the plates D are provided with the coincident recesses *b*, of such size that when the plates are united the heads B are partially received into the annular groove formed by the united recesses, and thus an air-tight cylindrical chamber is produced about the cylinder A. The said recess also allows a slight radial movement of the plate D toward or away from the heads B.

The plates D are contracted by means of a band, F, having ears $e$, through which passes a bolt, having nuts at either end. Thus, these nuts being screwed down, the bolt and bands are contracted, and with them the plates D.

The operation is as follows: A suitable number of sheets of plastic composition being placed upon the core A, having the heads B attached, the plates D are placed about it, and the heating agent is admitted to the cavities of the core, heads, and plates. The effect of this is to warm the surfaces of the elements mentioned, thus softening the material. The nuts on the bands are now screwed down, contracting the bands and closing the plates D upon the material, the air escaping through the openings between the plates. This operation is continued until the heads have entered the recesses and come in full contact with the plates D. The edges of the plates D are now in contact, the springs D' having been forced outward by the pressure, and thus a tight heated cylindrical chamber is formed about the material, binding it firmly upon the core, and forming it into a homogeneous roll thereon. The heating agent is now drawn off and the cooling agent admitted to the cavities occupied thereby, the effect of which is to chill the core and heads and plates, which causes the material to shrink somewhat and bind itself with great power upon the central core A, the interior of the material sinking into the indentations or encompassing the projections upon the surface of the core.

If desired, the journals of the core may be provided with a male thread, a female thread to receive the same being cut in the plate B, at the center thereof, so that the core and thread may be firmly attached together.

In practice, it is better to first admit the heating agent to the core A and plates B, in order to expel the air from the material as the plates D are closed upon it.

The next operation is the turning or shaving of sheets from the homogeneous roll secured on the core, as aforesaid. The core A, with the homogeneous roll thereon, is now placed in the bearings and arranged to be rotated by suitable machinery, so that its surface shall come in appropriate contact with the knife H, which is supported in a vertical, or, if preferred, as in the present instance, horizontal, position by means of screws I, or any other suitable device which shall be capable of moving the knife toward the periphery of the core itself.

Now it is obvious that, if the core be rotated and the knife advanced, a strip or shaving will be turned off of the exterior surface of the roll at every revolution thereof. The thickness of each strip is determined by the rapidity with which the core rotates or the knife is advanced.

It is obvious that by means of suitable mechanism the core may be rotated and the knife simultaneously and suitably advanced. The strip turned off may, of course, be made continuous by having the knife continuously advanced as the core is rotated.

It is obvious that the device may be arranged so that the plates D can fit into recesses formed in the edge of the heads B.

What I claim as my invention, and desire to secure by Letters Patent, is—

1. As a means of forming a homogeneous roll of plastic composition, the combination of a hollow core, end plates, and segmental curved plates, all or any of which are provided with means of receiving and discharging or of receiving or discharging a heating or cooling agent, substantially as set forth.

2. A homogeneous roll of plastic composition immovably affixed upon a core by means of heat and pressure and subsequent shrinkage, substantially as specified.

3. A hollow cylinder or core provided with means of receiving a heating or cooling agent, substantially as and for the purpose specified.

4. A hollow plate provided with means of receiving a heating or cooling agent, as a means of securing a mass of plastic composition upon a core, substantially as set forth.

5. The cylinder or core A, substantially as and for the purpose specified.

6. The segmental plate D, with or without the spring D', and cavity E, substantially as set forth.

7. The heads or end plates B, substantially as shown and described.

8. The combination of the core or cylinder A, heads or end plates B, and segmental plates D, substantially as specified.

9. The within-described process for producing a sheet or strip of plastic composition, which consists in fixing a mass of the composition upon a core, and subjecting this mass to the action of a cutting-edge that reduces it to the dimensions desired, substantially as expressed.

10. Two or more hollow plates which, when united, form a cavity about a central core, substantially as specified, said plates and core, or plates or core being adapted to receive a heating or a cooling agent, or both thereof, as specified.

In testimony that I claim the foregoing improvement in the manufacture of sheets of plastic composition, as above described, I have hereunto set my hand this 5th day of March, 1878.

JOHN W. HYATT.

Witnesses:
 SAMUEL S. TIFFANY,
 WILLIAM R. SANDS.